July 3, 1956　　　　　　　　E. E. WATSON　　　　　　　　2,753,238
CURRENT PROFILE RECORDER

Filed Aug. 31, 1953　　　　　　　　　　　　　　　　　　4 Sheets-Sheet 1

Inventor:
Edmond E. Watson
by Wilson R. Maltby
D.C. Snyder
Attorneys

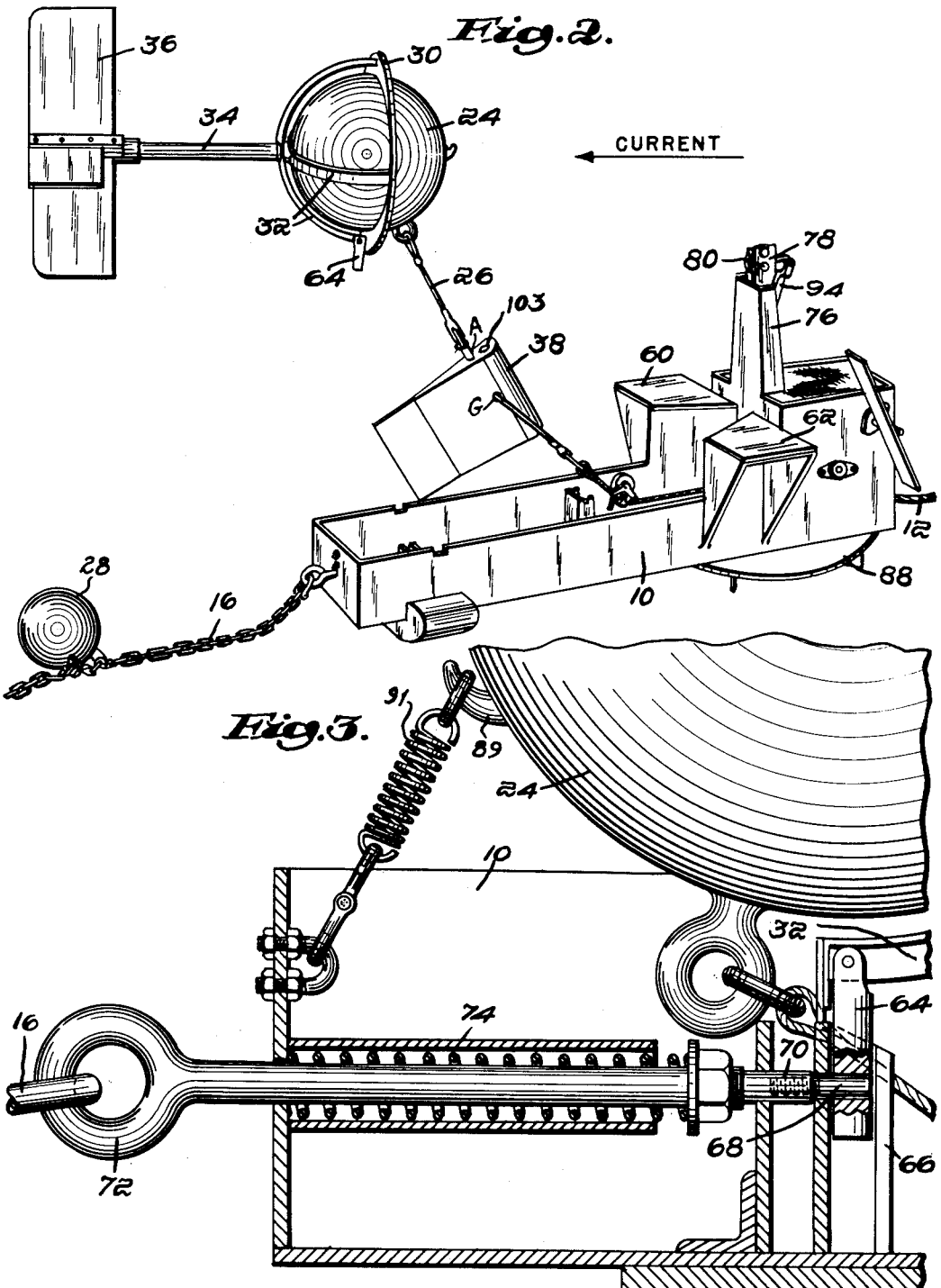

July 3, 1956

E. E. WATSON 2,753,238

CURRENT PROFILE RECORDER

Filed Aug. 31, 1953

Inventor:
Edmond E. Watson,
by Wilson R. Maltby
Attorneys

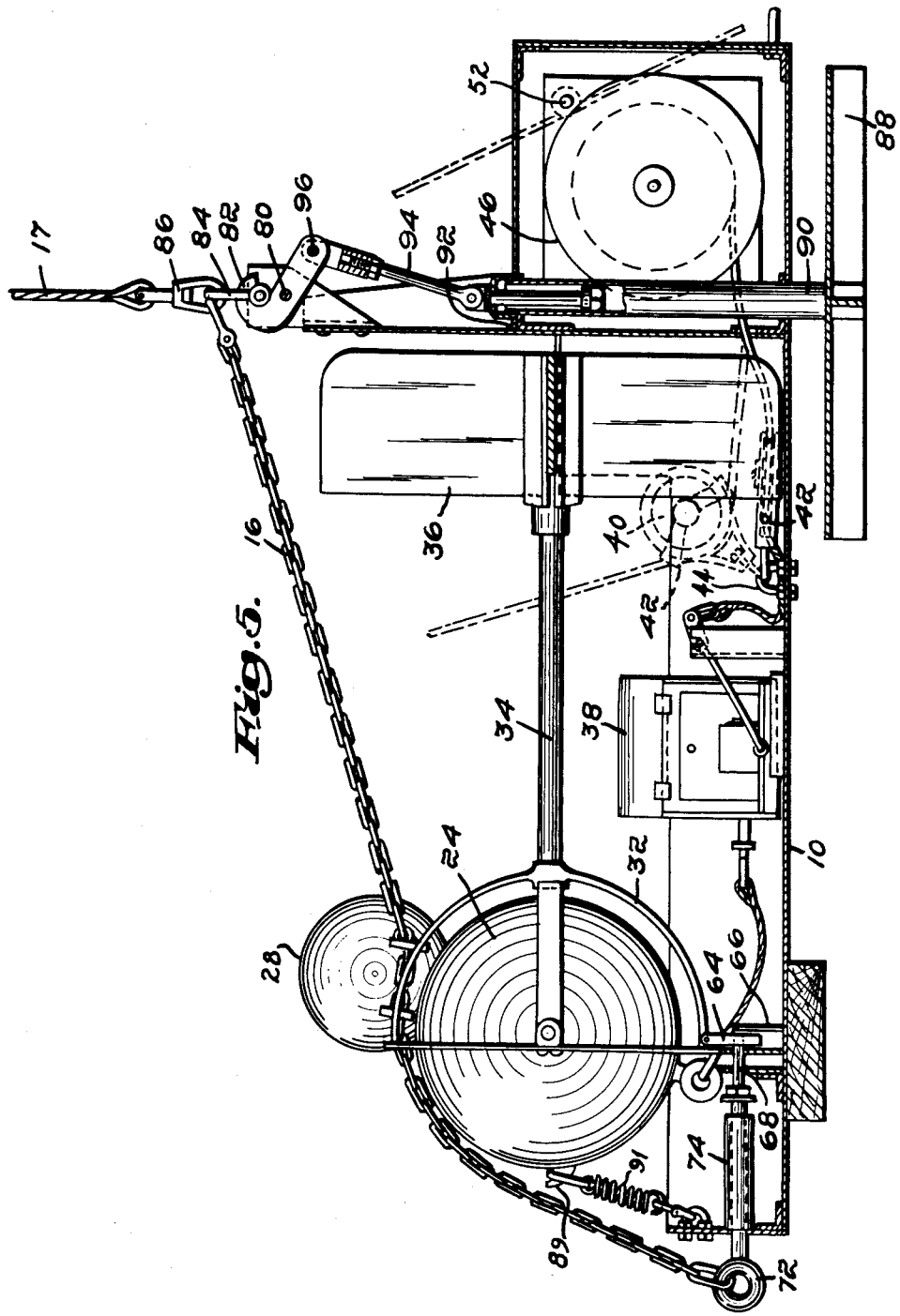

United States Patent Office 2,753,238
Patented July 3, 1956

2,753,238

CURRENT PROFILE RECORDER

Edmond E. Watson, Kingston, Ontario, Canada, assignor to the United States of America as represented by the Secretary of the Navy Application August 31, 1953, Serial No. 377,751

7 Claims. (Cl. 346—25)

This invention relates to a method and apparatus for measuring and recording the speeds of currents such as are present in oceans, rivers, and various other fluid bodies.

It is in general an object of the invention to improve current speed measuring methods and to devise an apparatus which includes means for carrying out current speed determinations at varying levels or depths in a fluid body. Another object is to provide a graphical record of current speeds against depth or height, continuous from top to bottom of the fluid layer, thus furnishing what may be conveniently referred to as a current profile record.

More specifically the invention is concerned with providing a current recording apparatus to solve the problem of obtaining current profiles at any desired positions in harbors, seas, and coastal waters, where the depth does not exceed 35 fathoms. The use at sea of previous types of current measuring equipment has involved several indeterminate factors, such as the motion of the ship, which complicate the observations and to a large extent render them impractical.

The apparatus of the invention simplifies the problem and avoids most of the difficulties through a combination of elements which provide a means for recording the pull or drag of a current on a buoyant body immersed in the current together with a means for continuously recording the depth at which the buoyant body is submerged. In obtaining the current speed data at a particular depth, several troublesome factors are avoided and only one simple angular relationship is required to be measured and recorded in conjunction with the depth reading. An important feature of the invention therefore is a method of supporting a body completely immersed in a fluid and holding the body in static equilibrium by a single mooring line; and then continuously measuring the inclination at which the mooring line meets the body, while the depth at which the body is located in the fluid is gradually changed.

Another important feature of the invention is the combination with a buoyant spherical body of an anchor box for containing the spherical body and releasing it in a controlled manner while immersed in a fluid body whose current speed is to be measured. Preferably a damping arrangement is connected to a suitable winch member for gradually unwinding a cable member by means of which the depth at which speed measurements are recorded may be varied at a uniform rate. The depth is also recorded by means of a pressure-sensitive device whose movement is correlated with that of the speed measuring device to provide a single trace on a slide element representing what is most conveniently referred to as a current profile record.

Another feature of the invention is a hook and release mechanism normally operating to maintain the buoyant body in a compactly stored position in the anchor body. The release mechanism is opened in response to a force developed upon contact of the anchor box with the ocean bed or bottom over which a current is flowing, thus freeing the buoyant body and permitting it to assume a desired position in response to the drag of the current.

Still another novel aspect of the invention is the combination with a spherical buoy of a narrow annular disc, placed equatorially around the sphere and maintained in a plane perpendicular to the current by means of a framework with horizontal and vertical fins tailing downstream in the current. The purpose of this is to provide a buoyant drag for which the relation between the drag coefficient and the current speed will be practically independent of the degree of turbulence in the current.

Other objects and many of the attendant advantages of this invention will be readily appreciated as the same becomes a better understood by reference to the following detailed description when considered in connection with the accompanying drawings wherein:

Fig. 2 is a perspective view illustrating a buoyant sphere removed from an anchor box and lying in an operative position such as the sphere normally assumes in response to the drag of a current as shown in Fig. 1;

Fig. 3 is a fragmentary view showing in vertical cross section one end of the anchor box and a mechanism therein for releasing the buoyant sphere;

Fig. 5 is a view in side elevation of the anchor box and the device mounted therein;

Figure 1:
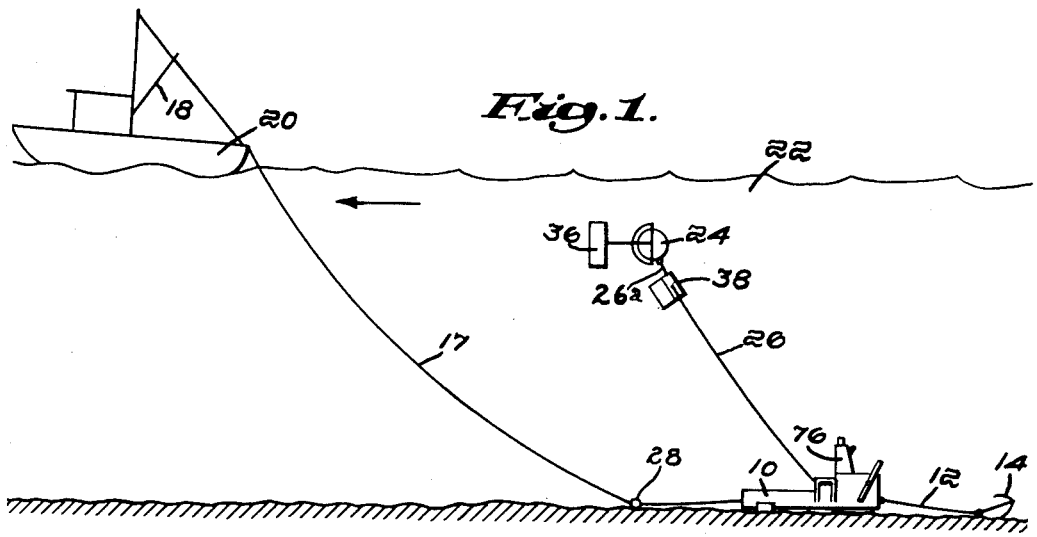
Fig. 1 is a diagrammatic view intended to indicate generally the manner in which the current profile recorder of the invention is employed and further illustrating relative positions of the device and a vessel from which it may be operated in an ocean current.

The method of recording of the invention is based upon a recognition of the relationship between the forces acting on a buoyant body when held completely immersed in a moving fluid mass. These forces include the weight of the buoyant body $W_s$; the buoyant force $B$ which is the weight of the fluid displaced by the buoyant body; the drag or pull $D$ of the moving fluid; and finally the tension $T$ of the mooring line which anchors the body. The combined effect of these forces, it is found, will cause the buoyant body to move to a position of equilibrium in which the mooring line at points near or closely adjacent to the buoyant body is inclined to the vertical at an angle $\theta$ given by the equation $$D = (B - W_s) \tan \theta$$

By measuring $\theta$, the drag $D$ and hence the speed of the moving fluid may be determined.

The device illustrated in the drawings therefore comprises essentially a means of measuring the angle $\theta$ of the mooring line of a buoyant body, and among its principal parts are included a buoyant spherical body, an annular disc around this body maintained in a desired position by a finned tail; an inclinometer attached to the mooring line at the buoyant body, a pressure responsive member whose movements are correlated with those of the inclinometer; and finally an anchoring apparatus for positioning the spherical body at desired positions in a current flow.

The several pieces of apparatus noted, although not limited to any particular size or proportion, are preferably constructed on a scale such that a fully assembled unit represents a considerable weight and volume and is usually handled by mechanical hoisting equipment such as is readily afforded by small vessels equipped with a boom and a winch for wire cable. For example, the anchor body may be of an overall length of from five to six feet and an overall width of about two feet. Similarly the sphere may have a diameter as great as fourteen inches or larger. The mooring line for attaching the sphere to the anchor box may for instance have a length of three hundred feet or more, and since all of the parts are preferably constructed of metal, a weight of three to four hundred pounds may be involved.

Considering in further detail the various elements noted, and having in mind the general size specifications outlined, number 10 denotes an anchor box which is provided with an anchor rope 12 and an anchor 14 attached at the forward end as indicated in Fig. 1. At the opposite end of the anchor box is secured a hoisting line 17 running back to the boom 18 of a vessel 20 lying at the surface of a body of water 22. A buoyant sphere 24 is immersed in the body of water 22 and secured to the anchor box 10 by means of a mooring line 26 which is so arranged that it may be allowed to run out gradually. This permits the sphere to move upwardly toward the surface of water 22 and in so doing become exposed to the action of varying current forces occurring at the different levels.

In Figs. 2–5 inclusive, there have been illustrated different positions assumed by the buoyant sphere 24. In Fig. 2 for example, the sphere 24 is shown in an operative position, similar to the position indicated in Fig. 1, although viewed from a point much closer to the device. An important element of the sphere 24 is a flange 30 located around a great circle of the sphere and mounted on supporting arms 32 which in turn are mounted on a shaft 34 extending rearwardly from the sphere 24. At the end of the shaft is a tailpiece 36 consisting of a plurality of fins which serve as a rudder for maintaining the flange 30 in a position substantially at right angles to the path of movement of the fluid body 22 in which the sphere is suspended. The effect of this arrangement is to maintain the buoyant sphere in a position of equilibrium, with the result that the mooring line assumes an inclined position whose precise angle of inclination θ at the sphere may be observed and recorded for various levels of the sphere by means of a measuring device 38, the mechanism of which including the record may be enclosed in a cavity within the device 38 so that the water and its current will not affect the inclination of the pendulum or stylus member or the permanency of the record. This device is referred to as a bathyclinograph and is fastened into the mooring line at a point just below the sphere, the angle of the body of the device 38 being arranged at the same inclination to the horizontal as the mooring line 26 makes with the vertical.

The mooring line preferably consists of a small stainless steel wire rope or cable which is guided around a pulley 40 supported in a bearing member 42, in turn fastened to the base of the anchor box 10 by a ring member 44. The mooring line or cable extends forwardly along the base of the anchor box and is wound upon itself about a drum or winch 46 as shown in Fig. 5. A large gear 48 shown in Fig. 4 is fastened on a shaft 50 mounted with journal bearings attached to the sides of the anchor box.

Extending transversely through the two opposite sides of the box at the upper corners thereof is a parallel shaft 52 carrying a small gear 54 in mesh with the gear 48. The shaft 52 extends through one side of the anchor box and has fastened thereon a rotating paddle blade or member 56. In operation the pull of the mooring line 26 causes the drum 46 to unwind, but on doing so it must rotate the paddle at a much higher rate. The resistance of the water to the paddle provides a damping action which regulates the rate at which the mooring cable is paid out. For rewinding the cable a removable handle, not shown, is attached to the end of shaft 50 or the paddle itself may be rotated by hand.

Figure 4:
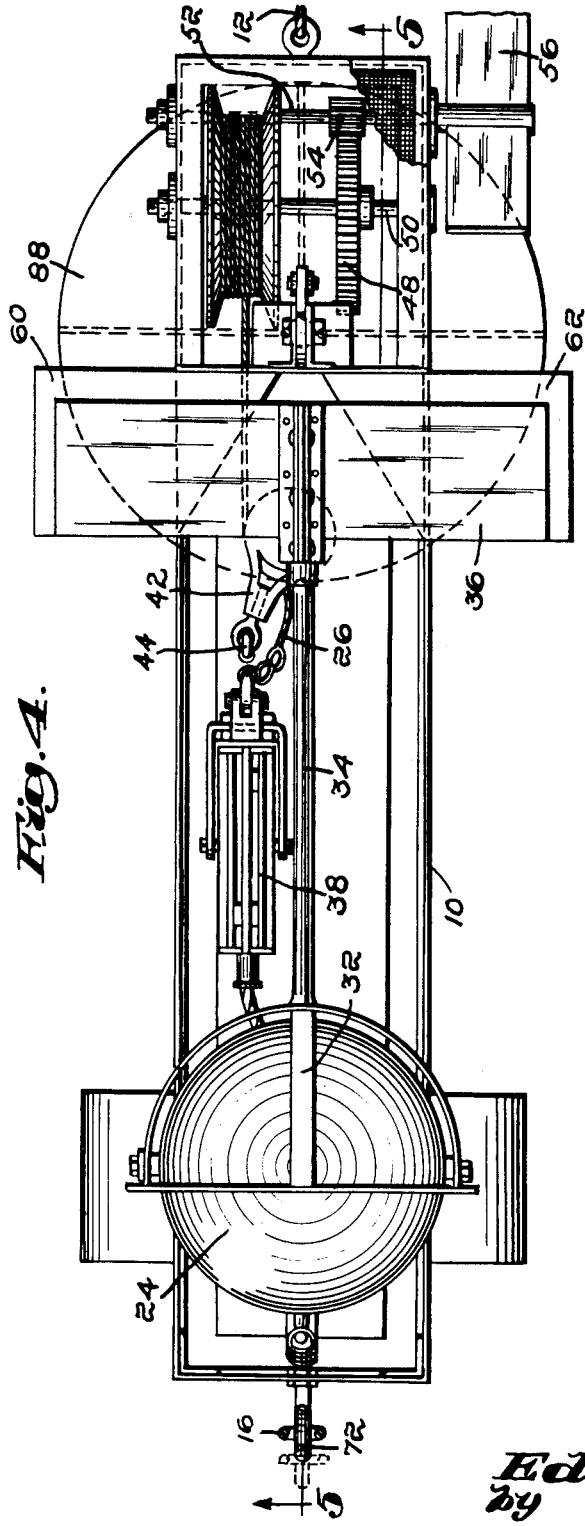
Fig. 4 is a plan view showing the recording device stored in the anchor box in readiness to be lowered away into a body of water.

When not in operation the device is compactly stored in the anchor box 10 as illustrated in Figs. 4 and 5. As shown therein, the fins 36 of the tailpiece are positioned flatwise upon two spaced-apart deck portions 60 and 62, with the sphere and tailpiece having been turned end for end. When thus located the shaft 34 extends rearwardly above the anchor box and sphere 24 assumes a position at the rear of the anchor box with a tongue element 64 linked to one of the arms 32, extending downwardly into sliding engagement with an upright flat or tubular channel member 66, mounted in the base of the anchor box. The tongue element 64 is formed with an opening which lies in register with another similar opening formed through one side of the channel member. A stainless steel pin 68, threaded into the shaft 70 of the draw-bolt 72, projects through the two openings, thus locking the tongue 64 and the sphere 24 in the relative position described.

In this general assembly of the device the hoisting line 17 consisting of a wire rope for example of 5/16" diameter, supports the anchor box assembly through the swivel 86, but continues with a slack chain section 16 to the eye-bolt 72. To avoid fouling the framework 32 of the buoyant sphere, this chain is supported by a small spherical float 28. The swivel 86 is connected through a shackle 84 to a locking mechanism at the highest point of the anchor box. This mechanism includes an upright supporting member 76 of hollow construction at the top of which is secured a bracket 78 having a U-slot in the upper edge thereof to receive the transverse element of shackle 84. Between the sides of the bracket is a pin member 80 about which is pivotally secured a hook member 82. In the stored position of the apparatus described, the hook member 82 normally lies in a locking position such as shown in Fig. 5, with the curved extremity of the hook 82 passing through and holding the shackle 84, engaged in the swivel 86 in the hoist line 17, and locking the shackle to the U-slot until the hook 82 has been released to pivot on pin 80.

When thus secured, and carrying the weight of the anchor box, the hoist line 17 will assume a substantially vertical position as noted in Fig. 5, thus tending to suspend the anchor box in a somewhat horizontally disposed position convenient for lowering away the device from the deck of the vessel 20.

In the actual operation of the device, it is lifted by means of a suitable hoist mechanism supported from boom 18 of the vessel 20, and allowed to descend into the body of water 22, whose current conditions are to be observed, until the anchor touches bottom and takes hold. Then the anchor box is lowered onto the bed or bottom of the sea or other body of water. On contact, the hoist line is released from the hook 82 in the following manner. A disc member 88, fast on a shaft 90, extends in spaced relation below the under side of the anchor box, as is more clearly shown in Fig. 5. The shaft passes upwardly through a supporting bracket 92 and is connected at its upper end with a rod 94, in turn attached to the hook member 82 by means of a pin 96. As the anchor box bottoms on the ocean floor, the disc member 88 is forced upwardly, thus rotating the hook member 82 into a position such that the shackle 84 slips out of engagement with it. Thereupon the hoist line falls back into a somewhat angular position extending away from the rear end of the anchor box, being still connected to the eye-bolt 72 through the chain 16. Since the anchor box will have become moored in a stationary position by means of the anchor 14 and its line 12, a relatively strong force is developed in the line 17 and the chain 16, tending to pull the eye-bolt in a rearward direction from the anchor box. When the eye-bolt is thus pulled out, it disengages the pin 68 from the tongue member 64, releasing the sphere 24. A small hook 89 on the sphere, diametrically opposite to the tail shaft, is shown in Fig. 5 linked to the anchor box through a short resilient member 91. When the sphere is released by the outward movement of the eye-bolt 72 the buoyancy of sphere 24 lifts the sphere thus withdrawing tongue 64 from channel 66, and the sphere and tail structure pivot upward about hook 89, lifting the tail clear of the anchor box. The hook then disengages member 91, while the force of the current on the tailpiece swings it around downstream as shown in Figs. 1 and 2. As the mooring line 26 is paid out from drum 52 at speed controlled by paddle 56 and becomes taut the system adjusts itself to an equilibrium position of line 26 as hereinbefore described.

Figure 6:
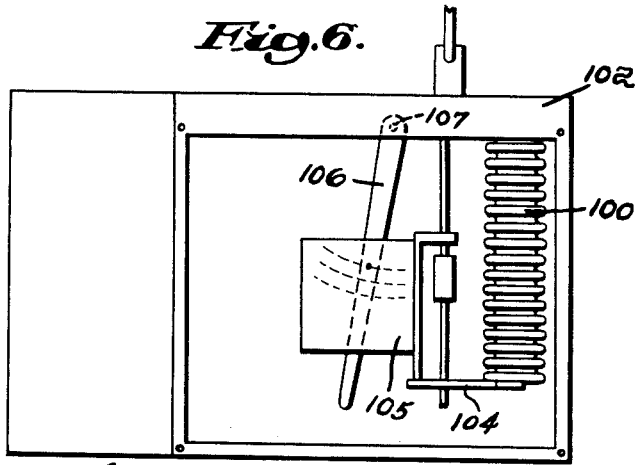
Fig. 6 is a detail elevational view of a pressure-responsive element disposed within a housing with the front cover removed and referred to throughout the specification as a bathyclinograph.

During the release of the sphere 24, the bathyclinograph member 38 is raised and turned upon itself into a position such that the two points of suspension are in line with the cable 26a into which it is connected, as in Fig. 1. This member is designed to record the inclination of the mooring line 26a against the pressure of the fluid body in which the bathyclinograph is submerged. As shown in Fig. 2 it consists of an upright housing presenting a streamlined surface and having a rounded leading edge which tapers rearwardly to form a thin guide fin portion which is positioned downstream by the force of the current by virtue of suspension thereof from upper and lower pivot points near the leading edge. Enclosed within member 38 is a suitable pressure-responsive device for denoting depth, as illustrated in Fig. 6, consisting of an air-filled bellows member 100 fixed at its upper end in a housing 102 through which fluid is allowed to pass as by opening 103. Secured to the lower and movable end of the bellows 100 is a bracket member 104 on which is supported a scribing surface, such, for example, as smoked glass slide 105 of conventional character lying in scribing engagement with a scribing element attached to damped pendulum element 106, the upper end of which is supported by pin 107 for free pivoting within a vertical plane. The bathyclinograph is attached to the mooring line 26 by a stirrup hinged to a horizontal axle through the effective center of gravity of the instrument in water, while the short line 26a from the sphere is attached to a point A on the top of the bathyclinograph such that AG is parallel to the axis of movement of the bellows and the smoked slide. The inclination of the bathyclinograph is then determined solely by the line 26a connecting it to the sphere and it is independent of any forces affecting the shape or tension of the mooring line 26 below the instrument. In operation sphere 24 is paid out slowly by the action of gear 48 on small gear 54 which rotates the paddle at a rate that provides a damping action in order that the tension on mooring line 26 will cause the sphere to rise slowly and, when desired, continuously until it surfaces or is recovered by hoist line 17. As sphere 24 travels upward through the changing currents in the fluid body, the bellows, in response to change in pressure due to change in depth of the fluid body 22, expands or contracts and moves the slide 105 within the vertical plane and the pendulum 106 carrying a pen or scribe, in seeking to maintain a vertical position while the bathyclinograph is tilted, moves across the slide in a fore and aft arc scribing successive tilt angles transversely across the slide. There will then be produced a trace on the slide as in Fig. 7, showing the angle or inclination of the device at varying levels in response to current changes so that a current depth profile record is obtained.

Figure 7:
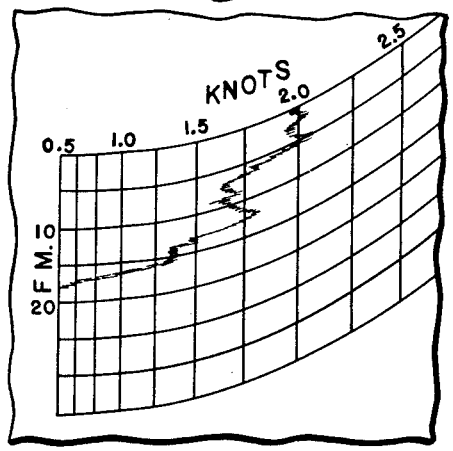
Fig. 7 illustrates a photographic print of an original smoked slide record on which a calibration grid has been superposed.

By superimposing a calibrated grid, as shown in Fig. 7, over the slide record so obtained, the horizontal speed of the fluid in knots may be determined for every level through which the device moves.

Within the scope of the present invention the mooring line may, of course, be paid out either from above or below a fluid body. The operation described hereinbefore illustrates the latter. To effect paying out from above, it is merely necessary to substitute for float 24 a mass of relatively high density to convert the lowered assembly, including tail means for self-orientation, into a sinking body paid out at a controlled rate, the measuring and scribing system then being simply inverted, to operate in the same manner as already described, the tilt being proportional to the drag and weight and calibrated to read in terms of current.

Obviously many modifications and variations of the present invention are possible in the light of the above teachings. It is therefore to be understood that within the scope of the appended claims the invention may be practiced otherwise than as specifically described.

What is claimed is:

1. A current measuring device comprising a buoyant body presenting stabilizing means secured at one side thereof, a wire element attached at one end to the body and having its other end secured to a drum, a housing for supporting the drum, means in the housing for rotating the drum and winding the wire upon itself, a pressure-sensitive member secured to the wire at a point just below the buoyant body, stylus means, a chart element actuated by said pressure-sensitive member, said chart element cooperating with said stylus means for indicating vertically on said chart element instantaneous ambient pressures, and a damped pendulum arranged to move said stylus means substantially horizontally across the chart element to indicate thereon instantaneous current speed factors.

2. A current measuring device comprising a buoyant spherical body having stabilizing means secured thereto, a hoisting cable, an anchor box having a slidable eye-bolt and pin member for storing said body in secured relation thereto prior to launching, a winch mechanism located in the front end of said anchor box and presenting a drum and a wire mooring line wound thereon, said line being connected to said body, locking means for detachably fastening said hoisting cable at the top of the anchor box, release means for freeing said cable from the top of said box in response to forces developed upon contact of the anchor box with a solid supporting surface and transferring the pull of said cable to said eye-bolt, said pin member being attached to said eye-bolt for disengaging said sphere from said anchor box after the pull of the hoisting cable has been transferred from the top of said box to said eye-bolt, and recording means fastened to said mooring line at a point below said sphere for denoting the angle of inclination to the vertical assumed by said line at the sphere when the latter is suspended in a moving fluid body.

3. A current measuring device comprising a buoyant spherical body having stabilizing means secured thereto, an anchor box having a slidable eye-bolt and a pin member for storing said sphere in secured relation when not in use, a winch mechanism located in the front end of said anchor box and presenting a drum and a wire mooring line wound thereon, said line being connected to said sphere, a hoisting cable attached to said eye-bolt, locking means for detachably fastening said hoisting cable at the top of said box, release means for freeing said cable from said box in response to forces developed upon contact of said box with a solid supporting surface and transferring the pull of said cable to said slidable eye-bolt at the end of the anchor box, a pin member attached to said eye-bolt for disengaging said sphere from said box after the pull of the hoisting cable has been transferred to said eye-bolt, and recording means fastened to said mooring line at a point just below said sphere for denoting the angle of inclination to the vertical assumed by the line at the sphere when the latter is suspended in a moving fluid body, said recording means including a housing having a rounded front edge which tapers rearwardly to form a thin guide fin portion, a closed bellows element partially disposed in said housing, a recording element partially actuated by said bellows element in response to a change in pressure, and a damped pendulum including a scribing means free to hang vertically in the housing and adapted upon change in inclination of the housing to act upon said recording element in a direction substantially perpendicular to the first said actuation thereof.

4. Apparatus for determining the speed of current flow in a fluid body comprising a buoyant body, a wire member holding said buoyant body immersed and in equilibrium in said current, a measuring device connected to said wire member adjacent to said buoyant body recording the angle of inclination of said wire member in response to the speed of said current, said measuring device including a streamlined housing adapted to assume the inclination of said wire member and a pendulous stylus pivoted in said housing, anchoring apparatus including mechanism progressively paying out said buoyant body from a maximum to a minimum depth in said current flow, pressure responsive bellows disposed within said housing and having one end secured thereto, a chart carried by the free end of said bellows, and said stylus being adapted to bear on said chart whereby a trace may be obtained on said chart recording current speed versus depth.

5. A measuring device for recording the horizontal speed of current flow in a fluid body comprising a current-oriented buoyant body, a mooring line for holding said buoyant body immersed in said current, and recording means fastened into said mooring line for progressively denoting the angle of inclination to the vertical assumed by said mooring line in response to the horizontal speed of said current, said recording means including an upright housing of streamlined form tapering rearwardly to form a thin guide fin portion, a bellows element substantially vertically disposed in said housing and having a free end movable in response to depth of immersion, a recording chart supporting member secured to said free end of said bellows element and movable parallel therewith, a recording chart mounted on said supporting member for movement therewith, a pendulum free to hang vertically in said housing, and a stylus mounted on said pendulum and adapted upon change of inclination of the housing to move in scribing contact across said recording chart.

6. A recording device for determining the speed of current flow in a fluid body comprising a buoyant body, mooring means holding said buoyant body in equilibrium in said current, a pressure-responsive mechanism in said device actuated in proportion to the depth at which said device is held in said fluid body, a scribing surface supported in a vertical plane and vertically movable by said pressure-responsive device in response to changes of depth, a damped pendulum carrying a stylus in scribing engagement with said scribing surface, said damped pendulum being free to hang vertically from said mooring means adjacent said buoyant body and adapted upon change in an inclination of said mooring means to move said stylus horizontally across said scribing surface, whereby current and depth factors are simultaneously recorded thereon, an anchor box member for storing said buoyant body in secured relation thereto when not in use, and means progressively controlling the depth of immersion of said device.

7. A measuring device for determining the speed of current flow in a fluid body comprising a buoyant body, a mooring line one end of which is connected to said buoyant body, an anchor box resting on the bottom of said fluid body, a drum secured to said anchor box about which is wound the other end of said mooring line, paddle means attached to said drum for regulating the speed at which said mooring line is paid out from said drum, an angle indicating device fastened into said mooring line adjacent said buoyant body and including a recording plane on which the angle of inclination to the vertical assumed by said mooring line in response to said current flow is indicated, said buoyant body being immersed and in equilibrium in said fluid body, a pressure actuated device mechanically coupled to move said recording plane in response to pressure changes transversely to the direction of said angle indication thereby to provide a current profile record, and an anchor line attached to said anchor box for hoisting the measuring device from said fluid body.

References Cited in the file of this patent

UNITED STATES PATENTS

| 2,142,135 | Lawton | Jan. 3, 1939 |
| 2,152,671 | Smith | Apr. 4, 1939 |
| 2,152,768 | Myers | Apr. 4, 1939 |
| 2,592,583 | Lyon | Apr. 15, 1952 |

FOREIGN PATENTS

| 879,791 | France | Nov. 30, 1942 |